United States Patent Office 2,741,996
Patented Apr. 17, 1956

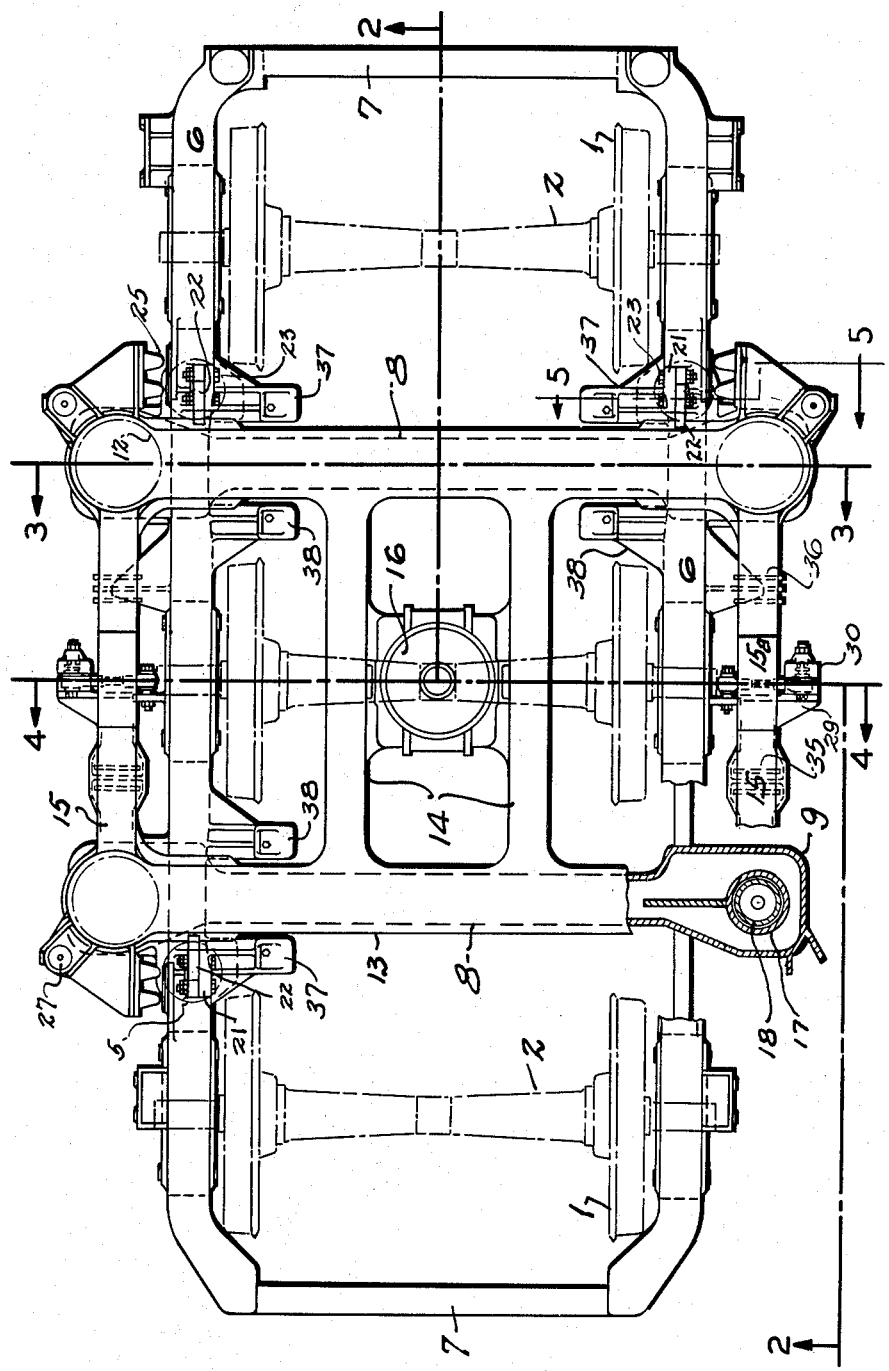

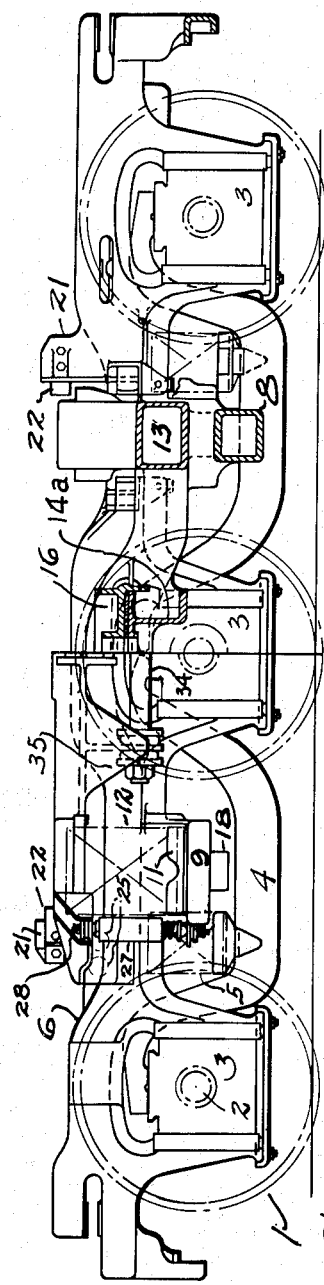

2,741,996

RAILWAY TRUCK

Thomas J. Kolesa, Edwardsville, Ill., assignor to General Steel Castings Corporation, Granite City, Ill., a corporation of Delaware Application January 28, 1952, Serial No. 268,511

17 Claims. (Cl. 105—196)

The invention relates to railway rolling stock and more particularly to trucks in which the truck frame is spring-supported from the wheel and axle assemblies and a load-carrying bolster is supported by springs mounted on the truck frame outwardly of the frame side members.

The main objects of the invention are to facilitate assembly and disassembly of the truck bolster with the other truck parts, to provide easy accessibility and inspection of parts subject to maintenance, to keep the wheel base of the truck to a minimum, to keep the number of parts to a minimum, to maintain a low height of truck center plate, and to simplify the construction of the truck. These objects are accomplished particularly in six-wheel trucks by dropping the wheel pieces between the wheels and extending the cross members of the load-carrying bolster over the frame side members, by positioning the intermediate portions of the bolster cross members over the frame transoms instead of between them as is customary, and by eliminating swing hangers and associated parts as are generally used in railway passenger trucks.

These and other detail objects are attained by the structure shown in the accompanying drawings, in which:

Figure 1 is a top view of a truck of the type described, a portion of the structure being sectioned horizontally on the line 1—1 of Figure 3.

Figure 2 is in part a side view and in part a longitudinal vertical section taken on the line 2—2 of Figure 1.

Figures 3 and 4 are vertical transverse sections taken on the corresponding section lines of Figure 1.

Figure 5 is an enlarged vertical transverse section taken on the section line 5—5 of Figure 1.

The truck includes the usual wheels 1, axles 2, journal boxes 3, equalizers 4, and equalizer springs 5. The truck frame includes side members or wheel pieces 6, end transoms 7, and intermediate or center transoms 8.

Center transoms 8 are substantially below the level of side members 6 throughout the major portion of their length and terminate in brackets 9 extending outwardly of the truck beyond the frame side members, there being upward extensions 10 merging with the major portion of the transom and bracket and with the side members 6. Brackets 9 carry seat members 11 for upright coil springs 12 which, in turn, mount the load-carrying bolster, which includes transverse transom-like members 13, positioned over the truck frame transoms 8. The end portions of the bolster transoms extend over the side members of the truck frame and form spring caps resting upon springs 12. Members 13 are connected by longitudinal central members 14 and longitudinal side members 15, forming side bearings 15a. Integral with longitudinal members 14 is an inverted U-shaped cross tie 14a extending over the middle axle and carrying a body-supporting center plate 16 below the level of the adjacent portions of wheel pieces 6, which receive the journal boxes on the middle axle.

Preferably the truck frame and bolster consists of one-piece castings and each of the main parts of the truck frame and bolster are of box cross section to afford maximum strength for a given amount of metal.

Each bracket 9 includes an upright circular web 17 at the center of the bracket receiving a cylinder-like projection 18, depending from the associated spring seat 11. Each projection 18 extends downwardly below its supporting bracket 9 a substantial distance to be engaged by a jack, not shown, whereby the spring seats, springs, bolster and superimposed load may be lifted from the truck frame and running gear to permit the insertion of shims to complete the bolster level and to maintain the desired center plate height.

The truck is characterized by the substantial vertical alignment of the truck frame transoms 8 and the bolster transoms 13 and by the low level of the truck frame transoms and the bolster transoms relative to the frame side members and the bolster supporting springs, which facilitates the use of a substantially shorter wheel base than would be present if the bolster transoms were positioned between double frame transoms, as is the usual arrangement. The brake hanger brackets 37 and 38 extend inwardly from the truck frame wheel piece and are positioned approximately at the same level as the adjacent portions of the bolster transverse members 13 and at a higher level than the truck frame transoms 8. In previous arrangements of six-wheel trucks, the frame transom extended alongside of the bolster cross member, and at least one of the brake hanger brackets was formed as a part of the frame transom which was at the same level as the brake hanger bracket. In the present arrangement, the brackets 37 and 38 are on opposite sides of the bolster cross member, and the arrangement provides for a minimum wheel base because the wheel base would have to be longer if the truck frame transoms were positioned alongside of the bolster transverse member and included the brake hanger bracket. If the truck frame transom were located alongside of the bolster transverse member, as in previous arrangements, then due to space required for the transom, more room would have to be provided for such structure than is required for the brackets 37 and 38 in the present arrangement.

An upstanding bracket 21 is provided on the frame near the end of each bolster transom 8 for the attachment of a lift bar 22 secured to the bracket by detachable bolts 23. Each bar projects from the bracket over a portion of the bolster transverse member at a point adjacent to the spring cap portion 24 of the bolster transom.

Rubber bumpers 25 are secured to the upwardly extending portions of the bolster transoms 13 and oppose the frame wheel pieces to limit lateral movement of the bolster relative to the frame. Rubber bumpers 25 are positioned outwardly of the truck frame wheel pieces where they can be easily inspected and replaced.

Projecting diagonally laterally from each transom bracket 9 is an arm 26 to which is attached the lower end of a telescoping vertically disposed shock absorber 27. The upper end of the shock absorber is secured to a corresponding arm 28 on the bolster. These shock absorbers control the action of bolster springs 12.

At the outer side of each bolster side member 15 is a bracket 29 on which is mounted a vane-type shock absorber 30, the depending arm 31 of which is connected by a link 32 to a bracket 33 on the adjacent portion of the truck wheel piece. These shock absorbers control relative lateral movement of the frame and bolster.

Bolster anchors 34 are positioned below the bolster side members 15 and are secured to suitable brackets 35 and 36 on the bolster side members and the frame wheel pieces, respectively.

All of the shock absorbers are positioned at the outer side of the truck where they are readily accessible for adjustment and replacement and where they do not interfere with the application of brake rigging, the bolster anchors or other equipment on the truck frame wheel pieces or on the bolster side members.

The construction makes it possible to assemble the bolster with the remainder of the truck structure by lowering the bolster from above onto its spring supports. This cannot be done with the usual arrangement of H-shaped truck bolsters, in which the bolster transverse members extend under the frame side members.

The structure described forms a simple, effective truck attaining the objectives set forth in the introductory portion of the specification and it will be understood that the details shown may be modified substantially without departing from the spirit of the invention and the exclusive use of such modifications as come within the scope of the claims is contemplated.

What is claimed is:

1. In a railway truck, three axles and wheels, journal boxes mounted on said axles outwardly of the wheels, equalizers thereon, a frame supported from said equalizers and including side members outwardly of the wheels and having depending pedestals slidably receiving said boxes, there being brackets on said side members positioned outwardly from said side members intermediate said axles and forming spring supports, springs carried on said supports, and a bolster including a transverse member extending over said side members and mounted on said springs, the bolster including a load-carrying center plate intermediate said side members over the middle axle.

2. In a railway three axle truck, a truck frame including side members spaced apart transversely of the truck and having brackets at each side of the truck spaced apart longitudinally of the truck from the middle axle and projecting outwardly from said side members, a spring carried on each of said brackets, a truck bolster comprising transverse members spaced apart longitudinally of the truck and extending over said side members and mounted on said springs, and structure extending longitudinally of the truck between said transverse members and provided with a load-carrying bearing at the center of the truck and over the middle axle.

3. In a railway truck, three wheel and axle assemblies, each including journal boxes at the side of the truck, drop equalizers mounted on said boxes, springs on said equalizers, a truck frame mounted on said springs and including side members having depending pedestals slidably receiving the journal boxes, the frame including a transverse transom positioned between the middle axle and each end axle, each transom having a bracket at each end extending outwardly of the truck beyond the frame side members, an upright coil spring carried on each of said brackets, and a load-carrying bolster including transverse members having portions positioned over said transoms and supported on said coil springs, the bolster having members extending longitudinally of the truck between said transverse member portions and forming side bearings at a higher level than said frame side members.

4. In a railway truck, a truck frame including wheel pieces and spaced apart transverse transoms depending from and extending between said wheel pieces at a level below said wheel pieces, bracket-like members on the ends of said transoms projecting outwardly of the truck beyond said wheel pieces, a spring carried on each of said members, and a bolster including transverse members with end portions mounted on said springs and extending inwardly therefrom over said wheel pieces and then downwardly to below the level of the tops of said wheel pieces and above said frame transoms, there being a load-carrying center plate supported from said bolster members below the level of the top of said wheel pieces.

5. In a railway truck, truck frame wheel pieces of box-like cross section, truck frame transverse transoms of box-like cross section spaced substantially below the level of said wheel pieces with end brackets extending outwardly of the truck beyond said wheel pieces, there being upwardly extending parts on said transoms merging with said wheel pieces, upright coil springs on said brackets, and a bolster with box-shaped transom-like members extending transversely of the truck directly above said frame transoms and said wheel pieces and mounted on said springs.

6. A railway truck as described in claim 2, which includes upright shock absorbers controlling the action of the bolster supporting springs, the lower end of each shock absorber being connected to the spring-carrying bracket on the truck frame of the associated spring and the upper end of the shock absorber being secured to the adjacent portion of one of the truck bolster transverse members.

7. In a railway truck, a truck frame including side members spaced apart transversely of the truck and having brackets at each side of the truck spaced apart longitudinally of the truck and projecting outwardly from the frame below the general level of said side members, springs carried on said brackets, a truck bolster comprising transverse members spaced apart longitudinally of the truck and extending over said side members and mounted on said springs, and structure extending longitudinally of the truck between said transverse members and provided with a load-carrying side bearing disposed outwardly of the side members of the truck intermediate the corresponding brackets.

8. A railway truck as described in claim 7, which also includes a load-carrying center plate at the longitudinal and transverse center of the truck.

9. A railway truck as described in claim 7, which includes shock absorbers for controlling the lateral movement of the bolster relative to the truck frame, one portion of each shock absorber being secured to the intermediate portion of one of the bolster side members forming a side bearing, and the other portion of the shock absorber being connected to the adjacent truck frame side member at a point spaced laterally and inwardly from the associated bolster side member.

10. A railway truck as described in claim 7, which includes anchors extending longitudinally of the truck beneath the side bearings, each anchor being connected at one end to a frame side member and at its other end to a bracket on the bolster structure forming the side bearing.

11. In a railway truck, wheels and axles, a rigid truck frame including side members positioned above the level of said axles and a transverse transom depending from and extending between said side members at a level below said side members, bracket-like extensions on the ends of said transom projecting outwardly of the truck beyond said side members, springs carried on said extensions, and a bolster having end portions mounted on said springs and extending inwardly therefrom over said side members and then offset bodily downwardly and above and close to said frame transom, there being brackets extending inwardly of said side members adjacent to the downwardly extending portions of said bolster and above the level of the frame transom and comprising supports for brake hangers.

12. In a railway truck as described in claim 11 in which the truck is of the three axle type and the frame has a single transom between the middle axle and each end axle and the bolster includes longitudinally spaced transverse members, each member being positioned over one of said truck frame transoms, and in which said inwardly extending brake hanger support brackets on the truck frame are provided on each side of each of said bolster transverse members.

13. In a railway truck, a truck frame including longitudinal wheel pieces and spaced apart transverse transoms depending from and extending between said wheel pieces at a level below said wheel pieces, each of said transoms projecting at its ends outwardly beyond said wheel pieces, a bolster having spaced apart transverse members disposed above said transoms and vertically aligned therewith, said bolster transverse members projecting at their ends outwardly over said wheel pieces above and facing downwardly towards the extended ends of said transoms, and a resilient member bearing supporting said bolster member ends on the corresponding ends of the transoms.

14. A railway truck as described in claim 13 in which the bolster transverse members are interconnected at their projecting ends by longitudinal members disposed outwardly of the wheel pieces and by parallel longitudinal members inwardly of said wheel pieces, and a load-carrying center plate supported by said latter-mentioned longitudinal members.

15. A railway truck as described in claim 3 in which the bolster transverse members are aligned with the transoms, there being a center plate supported by said bolster, each transom and bolster transverse member having their portions between said wheel pieces extending downwardly below the level of the tops of said wheel pieces so that said center plate is below said level.

16. In a railway truck, a truck frame including wheel pieces and spaced apart transverse transoms depending from and extending between said wheel pieces at a level therebelow, each of said transoms projecting at its ends outwardly beyond and below said wheel pieces and forming end brackets, a bolster having spaced apart transverse members disposed above and vertically aligned with said transoms, said bolster transverse members projecting at their ends outwardly and above said wheel pieces and forming brackets vertically aligned with the end brackets of said transoms, a coil spring carried on each end bracket and bearing at its upper end against the associated bolster bracket for resiliently supporting the bolster, each end bracket and bolster bracket having outwardly projecting, vertically aligned lugs, and a vertically disposed shock absorber engaged at opposite ends thereto for controlling the action of the bolster supporting springs.

17. A railway truck as described in claim 2, which includes shock absorbers connected to the frame and bolster for controlling the lateral movement of the bolster relative to the truck frame, each shock absorber connection to the bolster being positioned outwardly of the truck frame side member and the shock absorber connection to the truck frame being positioned at a point spaced laterally and inwardly of the bolster connection.

References Cited in the file of this patent

UNITED STATES PATENTS

| | | |
|---|---|---|
| 2,168,578 | Perkins | Aug. 8, 1939 |
| 2,173,725 | Pflager | Sept. 19, 1939 |
| 2,238,593 | Kjolseth | Apr. 15, 1941 |
| 2,394,547 | Hickman | Feb. 12, 1946 |
| 2,519,169 | Beemer et al. | Aug. 15, 1950 |
| 2,598,870 | Williams | June 3, 1952 |
| 2,642,008 | Settles et al. | June 16, 1953 |